United States Patent [19]

Molnar

[11] 4,050,735

[45] Sept. 27, 1977

[54] MULTI-PURPOSE CAB FOR CONSTRUCTION VEHICLES

[75] Inventor: John Molnar, Aurora, Ill.

[73] Assignee: Caterpillar Tractor Co., Peoria, Ill.

[21] Appl. No.: 615,441

[22] Filed: Sept. 22, 1975

[51] Int. Cl.² .......................................... B62D 25/06
[52] U.S. Cl. .............................. 296/102; 180/89.12; 280/756; 296/28 C
[58] Field of Search ................... 296/28 C, 35 R, 102; 180/89 R, 89.12; 280/756

[56] References Cited

U.S. PATENT DOCUMENTS

| | | | |
|---|---|---|---|
| 3,443,833 | 5/1969 | Miller | 296/102 |
| 3,578,377 | 5/1971 | Babbitt | 296/102 |
| 3,841,430 | 10/1974 | Babbitt | 296/102 |
| 3,847,492 | 11/1974 | Kennicutt | 296/35 R |
| 3,866,969 | 2/1975 | Sandrock | 296/28 C |

FOREIGN PATENT DOCUMENTS

| | | | |
|---|---|---|---|
| 2,409,076 | 2/1974 | Germany | 280/756 |

Primary Examiner—Robert R. Song
Assistant Examiner—John A. Carroll
Attorney, Agent, or Firm—Phillips, Moore, Weissenberger, Lempio & Majestic

[57] ABSTRACT

A basic cab unit, mounted on the frame of a construction vehicle such as a wheel loader, comprises a substantially flat rear panel having a generally rectangular opening formed therethrough. The opening is defined by a plurality of mounting flanges adapted to have the mounting flanges of a window unit secured thereto. In a first embodiment of this invention the window unit, having mounting flanges extending outwardly therefrom, is secured to the mounting flanges of the basic cab unit along with flanges formed on a roll-over protection structure (ROPS). The latter structure further comprises a reinforced canopy which extends over a top panel of the basic cab unit. In a second embodiment of this invention a window unit constitutes the sole component secured to the basic cab unit by flanges formed thereon to extend inwardly towards each other.

18 Claims, 10 Drawing Figures

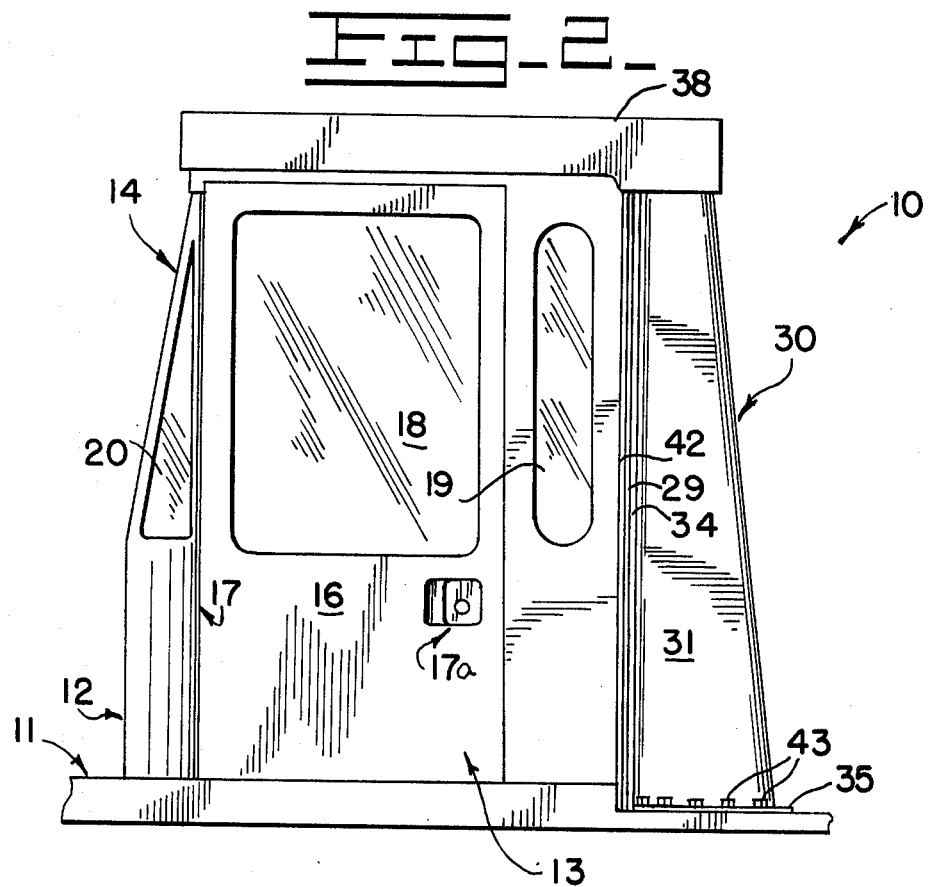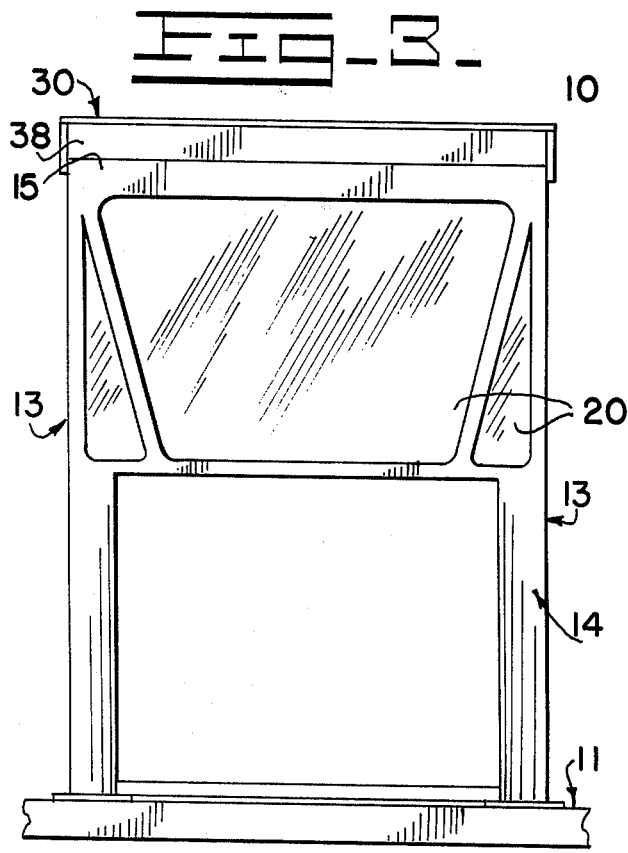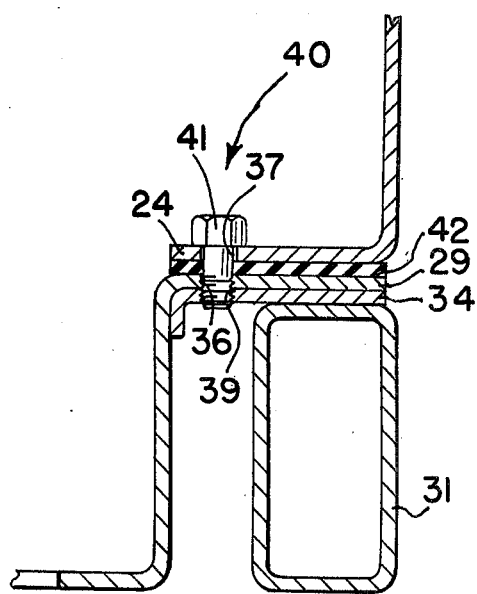

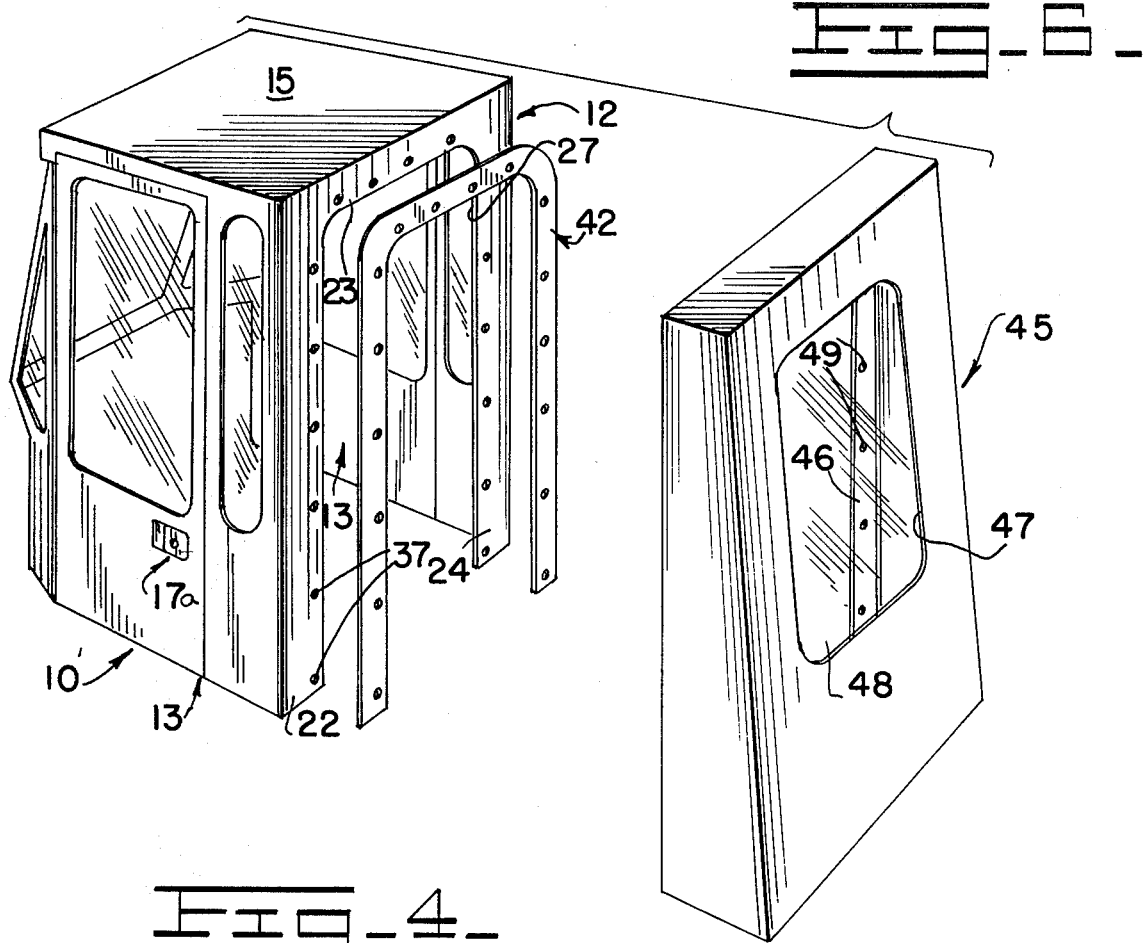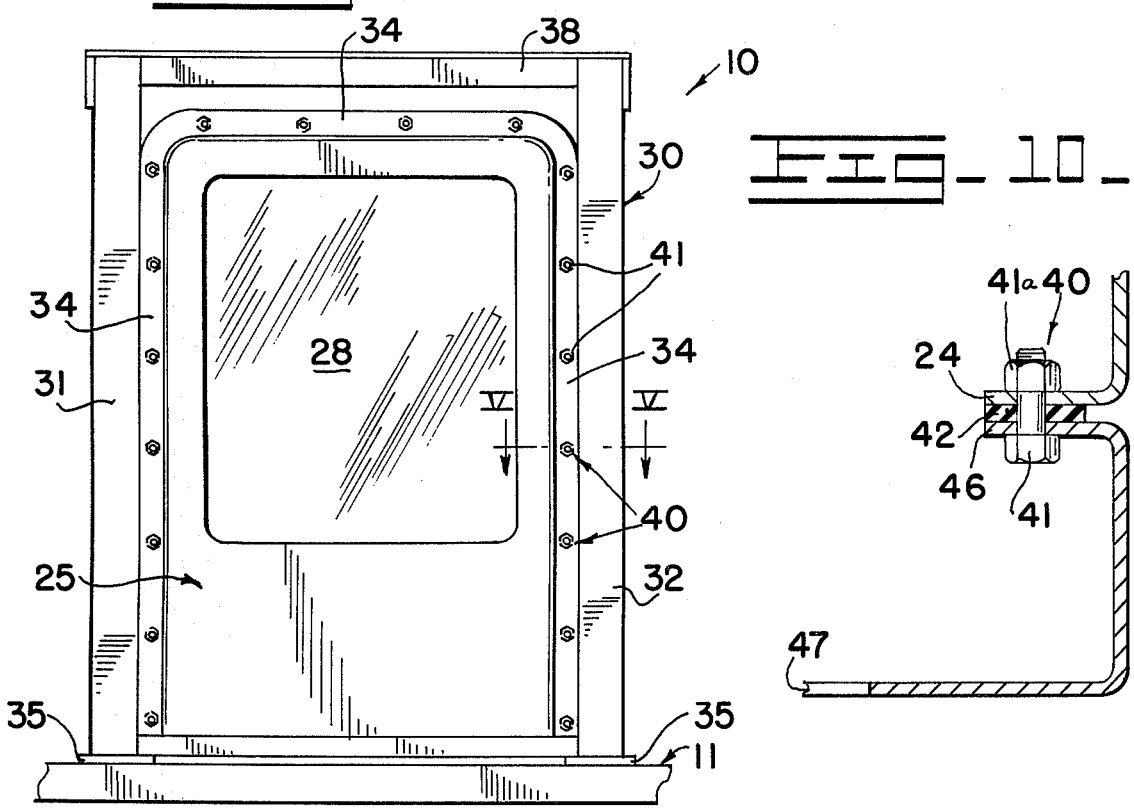

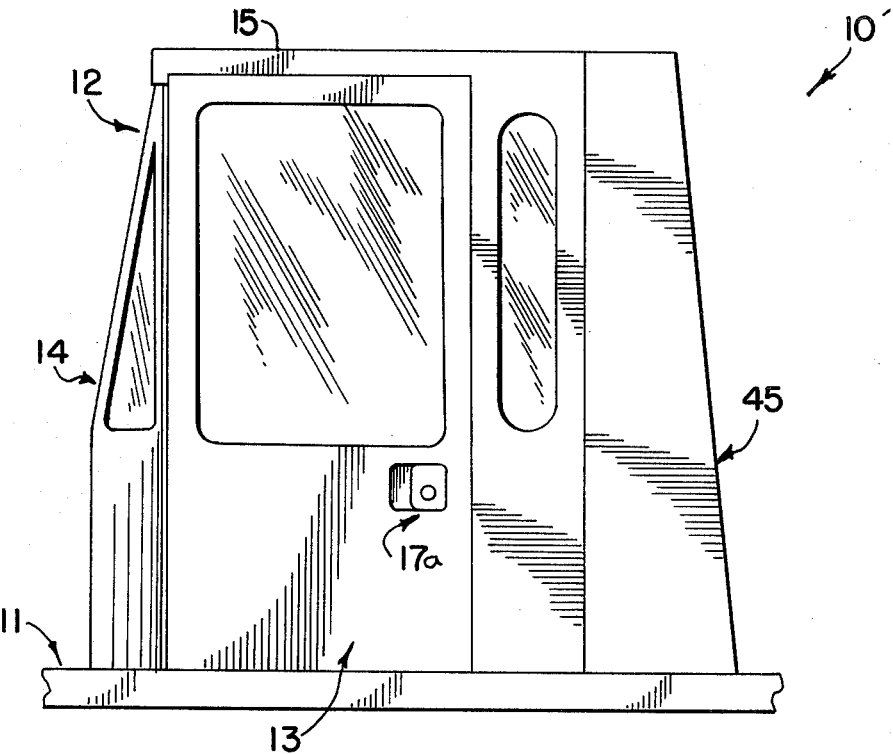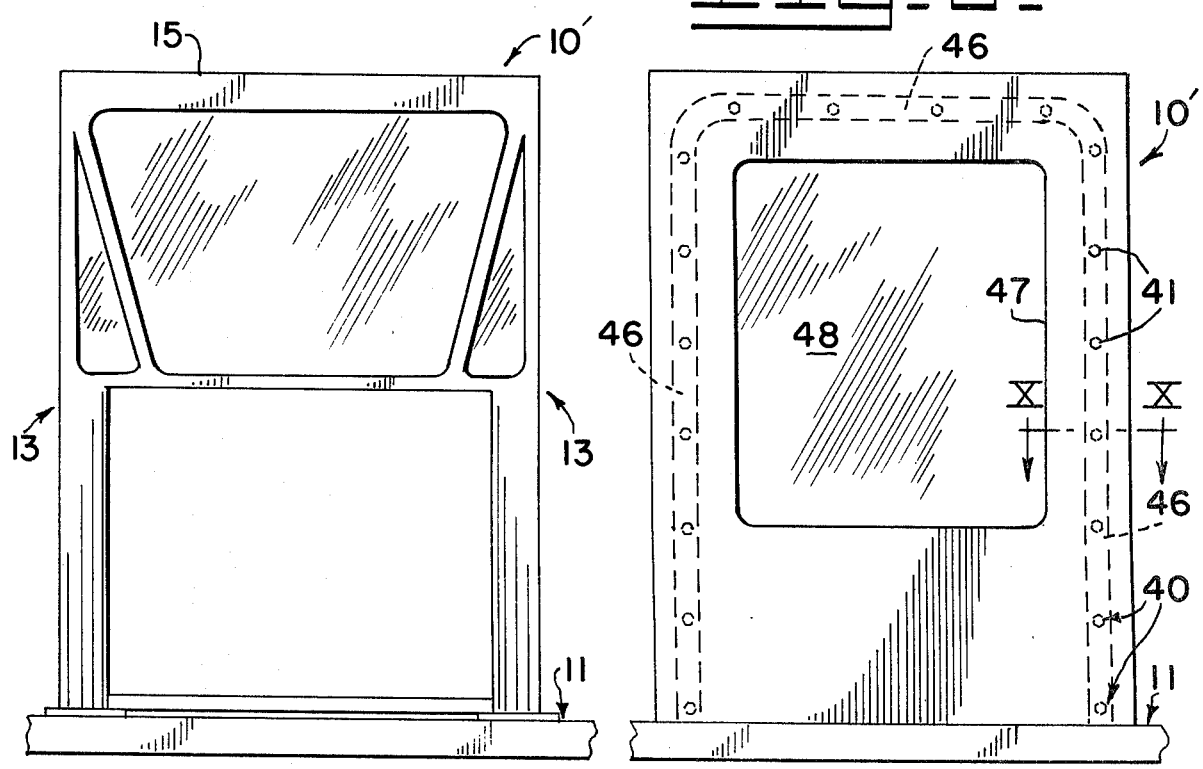

MULTI-PURPOSE CAB FOR CONSTRUCTION VEHICLES

BACKGROUND OF THE INVENTION

This invention relates to a cab structure of the type employed on construction vehicles, such as wheel loaders and the like. A wheel loader normally comprises an operator's cab mounted thereon which is enclosed to afford the operator environmental protection. In certain applications, it is desirable to provide the cab with a roll-over protection structure (ROPS), to afford the operator added protection. Such a structure is normally considered a specialty item and thus the standard cab must be replaced with a new cab designed to structurally integrate the roll-over protection structure therein.

SUMMARY OF THIS INVENTION

An object of this invention is to provide a multipurpose operator's cab for construction vehicles and the like which may be modified expeditiously to include a roll-over protection structure thereon without affecting the operator's visibility nor the basic structural integrity and appearance of the cab. A basic cab unit common to both of the first and second embodiments described herein comprises a pair of laterally spaced side panels, a front panel, a top panel and a rear panel secured between rearward ends of the side and top panels. First mounting flanges are formed on the rear panel to have one or two components releasably secured thereto.

In a first embodiment of this invention, a window unit having second mounting flanges formed thereon is secured to the flanges of the rear panel along with third flanges formed on a roll-over protection structure. In a second embodiment of this invention, a substitute window unit having second mounting flanges formed thereon is solely secured to the rear panel. The sides and top of the latter window unit are substantially flush with the adjacent sides and top of the cab.

BRIEF DESCRIPTION OF THE DRAWINGS

Other objects of this invention will become apparent from the following description and accompanying drawings wherein:

FIG. 2 is a side elevational view of the operator's cab mounted on a frame of a construction vehicle;

FIGS. 3 and 4 are front and rear elevational views of the operator's cab, respectively;

FIG. 5 is a sectional view taken in the direction of arrows V—V in FIG. 4, illustrating a fastening means for securing components of the cab together;

FIG. 6 is an exploded perspective view illustrating a second operator's cab embodiment of this invention;

FIG. 7 is a side elevational view of the FIG. 6 cab, showing it mounted on a frame of a construction vehicle;

FIGS. 8 and 9 are front and rear elevational views of the FIG. 7 cab, respectively; and FIG. 10 is a sectional view taken in the direction of arrows X—X in FIG. 9, illustrating fastening means for securing components of the cab together.

DETAILED DESCRIPTION

Figure 1:
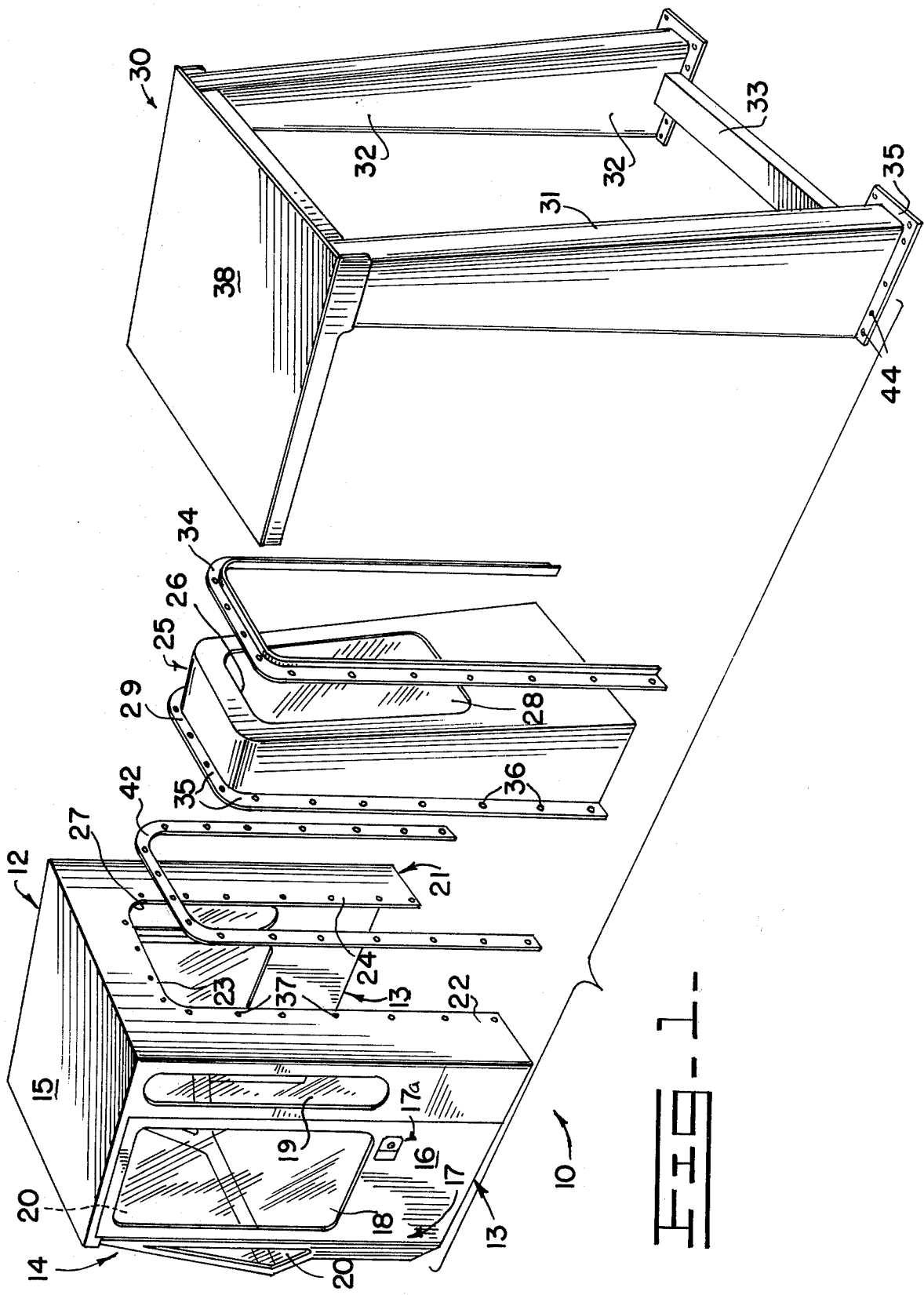
FIG. 1 is an exploded perspective view of a first operator's cab embodiment of this invention adapted for use on a construction vehicle.

FIGS. 1—4 illustrate a first operator's cab embodiment 10 of this invention, mounted and secured on the frame of a construction vehicle, generally illustrated at 11. The cab comprises a basic cab unit 12, including a pair of laterally spaced side panels 13, a front panel 14 secured between forward ends of the side panel and a substantially flat top panel 15 secured on the side and front panels. Each of the side panels may comprise a door 16 hingedly mounted thereon at 17 and having a standard latch assembly 17a, a window 18 mounted in the door and a second window 19 mounted in a stationary portion of such side panel.

Referring to FIG. 3, the front panel may comprise a plurality of windows 20 mounted thereon to provide the operator with unobstructed visibility. As shown in FIGS. 1 and 4, the cab further comprises a rear panel 21 secured between rearward ends of the side and top panels. The rear panel has three enlarged flanges 22, 23 and 24 formed thereon to extend inwardly towards each other to provide first mounting flange means adapted to secure a window unit or housing 25 to the cab.

The window unit comprises a generally rectangular opening 26 which is substantially coincident with an opening 27 formed through rear wall 21 of the cab and defined by flanges 22–24. A window 28 is mounted in opening 26 to provide an operator situated in the cab with unobstructed visibility rearwardly of the vehicle. The window unit further comprises peripheral flanges or second mounting flange means 29 formed on three sides of the periphery thereof to extend outwardly therefrom.

As more clearly shown in FIGS. 1, 4 and 5, a third and independent mounting flange means 34 is employed having bolt receiving threaded apertures 39 formed therein.

The cab further comprises a roll-over protection structure 30 comprising a pair of upstanding and laterally spaced supports 31 and 32 straddling window unit 25 and having their lower ends secured together by a cross brace 33. In addition, a mounting flange 35 is formed integrally on the base of each support 31.

The cab components illustrated in FIG. 1 are secured together by first positioning flange 29 of window unit 25 on flanges 22-24 of basic cab unit 12 to align bolt-receiving apertures 36 and 37 thereof. The three flanges of flange means 34 are then positioned so that threaded apertures 39 are aligned with apertures 36 and 37 for receiving a plurality of bolts 41. A seal means or gasket 42 is placed between structures 12 and 25 prior to installation of bolts 41 to prevent ingress of dust into the cab compartment. Structure 30 is then moved into nesting relationship against the backside of the window unit whereby a reinforced and substantially flat canopy 38 thereof, having its rearward end secured to upper ends of supports 31, rests on top panel 15 of the basic cab unit. A plurality of bolts 43 (FIG. 2) are then inserted through accommodating apertures 44, formed through mounting flanges 35, and threadably secured to frame 11 of the vehicle.

FIGS. 6–10 illustrate a second operator's cab embodiment 10' of this invention wherein a modified window unit 45 is attached to basic cab unit 12 in substitution of window unit 25 and structure 30. In essence, the latter embodiment is utilized in construction applications wherein the roll-over protection structure is not needed. Window unit 45 comprises three peripheral flanges or flange means 46 formed integrally thereon to extend inwardly therefrom.

A generally rectangular opening 47 is formed through a backside of the window unit and mounts a window 48 therein which is substantially coextensive with respect to opening 27 formed in the rear panel of the basic cab unit. The flange has a plurality of spaced apertures 49 formed therethrough which align with apertures 37 formed in flanges 22-24 to receive a plurality of fastening means 40 each comprising a bolt 41 and a nut 41a therein in the manner described above and as shown in FIG. 10. It should be noted in FIGS. 7-9 that the sides and top of the window unit are substantially flush with respect to side panels 13 and top panel 15 of the basic cab unit.

I claim:

1. A multi-purpose operator's cab adapted for use on a construction vehicle comprising;
   a basic cab unit including a pair of laterally spaced side panels,
   a front panel secured between forward ends of said side panels,
   a top panel secured on said side and front panels,
   a rear panel secured between rearward ends of said side and top panels, and
   first mounting flange means formed on said rear panel, and
   at least one rear member mounted on said rear panel and at least generally co-extensive therewith,
   second mounting flange means formed on the periphery of said rear member, and
   fastening means releasably securing said first and second mounting flange means together.

2. The cab of claim 1 wherein said first mounting flange means defines a generally rectangular first opening therethrough, and means defining a generally rectangular second opening through said rear member which is at least generally co-extensive with respect to said first opening whereby an operator situated in said cab has visibility rearwardly thereof.

3. The cab of claim 1 wherein each of said side and front panels and said rear member has at least one window mounted therein for providing an operator with unobstructed visibility around said cab.

4. The cab of claim 1 wherein said rear member comprises a window unit and further comprising a roll-over protection structure removably disposed adjacent to said window unit and independent third mounting flange means secured to each of said first and second mounting flange means by said fastening means.

5. The cab of claim 4 wherein three flanges of each of said first, second and third mounting flange means are secured to each other.

6. The cab of claim 5 wherein the flanges of said first mounting flange means extend inwardly towards each other and wherein the flanges of said second mounting flange means extend outwardly from said window unit and are disposed between the flanges of said first and third mounting flange means.

7. The cab of claim 4 wherein said structure comprises a reinforced canopy resting on the top panel of said basic cab unit.

8. The cab of claim 7 wherein said structure further comprises a pair of upstanding and laterally spaced supports straddling sides of said window unit and having their upper ends secured to rearward ends of said canopy.

9. The cab of claim 8 wherein said cab is mounted on a frame of a vehicle and wherein lower ends of said supports are secured to said frame.

10. The cab of claim 1 further comprising sealing means disposed between said first and second mounting flange means for preventing the ingress of dust and the like interiorly of said cab.

11. The cab of claim 2 wherein said rear member constitutes a window unit having said second mounting flange means formed thereon and further comprising a window mounted in said second opening.

12. The cab of claim 11 wherein three flanges of each of said first and second mounting flange means are secured to each other.

13. The cab of claim 12 wherein the flanges of each of said first mounting flange means extend inwardly towards each other and the flanges of each of said second mounting flange means extend inwardly towards each other.

14. The cab of claim 13 wherein said basic cab unit is mounted on a frame of a vehicle.

15. A multi-purpose operator's cab for use on a construction vehicle, comprising:
   a. a basic cab unit including
      i. a pair of laterally spaced side panels,
      ii. a front panel secured between forward ends of said side panels,
      iii. a rear panel secured between rearward ends of said side panels, said rear panel defining a first opening therethrough and including first mounting flange means extending about said first opening, and
      iv. a top panel secured on said front panel and said rear panel;
   b. a window unit including a housing removably connected to said rear panel and including two laterally spaced side walls extending rearwardly from said rear panel, a rear wall secured between rearward ends of said side walls, and a top wall secured to said rear wall and said side walls, said rear wall including a second opening having a window aligned with said first opening, and said housing defining a third opening adjacent said first opening and being generally co-extensive with said rear panel; and
   c. means for removably connecting said window unit to said rear panel, including
      i. a second mounting flange means extending from forward ends of said side walls and said top wall and aligned with said first flange means; and
      ii. fastening means releasably securing said first flange means and said second flange means.

16. A cab according to claim 15 wherein said second flange means extend outwardly from the periphery of said side walls and said top wall.

17. A cab according to claim 16 further comprising a roll-over protection means including:
   a. a pair of laterally spaced supports having upper and lower ends and straddling said side walls;
   b. a reinforced canopy secured to said upper ends of said supports and removably resting over said top panel; and
   c. means, connected to said lower ends, for releasably securing said supports to said vehicle.

18. A cab according to claim 17 further comprising a unitary gasket coextensive with said second flange means and connected between said first flange means and said second flange means to prevent the ingress of dust and the like interiorly of said cab and said window unit.

* * * * *